United States Patent Office 3,267,036
Patented August 16, 1966

3,267,036
METHOD OF PREPARING FLUID SILICONE COMPOSITIONS AND A CERIUM-CONTAINING ADDUCT THEREFOR
Hayward R. Baker, Silver Spring, and Jacques G. O'Rear, Stanhaven Subdivision, Camp Springs, Md., assignors to the United States of America as represented by the Secretary of the Navy
No Drawing. Filed Dec. 31, 1963, Ser. No. 334,944
4 Claims. (Cl. 252—49.7)

The invention described herein may be manufactured and used by or for the Government of the United States of America for governmental purposes without the payment of any royalties thereon or therefor.

This invention relates to a method of stabilizing liquid polysiloxanes for the preparation of high temperature stable fluid silicone compositions and to the preparation of an adduct which is an intermediate therefor.

Polysiloxanes with which the present invention is concerned are liquid methyl-, methylphenyl-, methylchlorophenyl- and methylphenylchlorophenyl polysiloxanes, i.e., liquid linear polymers in which the methyl group is the predominante substituent and the silicone chain is stoppered by trimethylsilyl or triphenylsilyl end groups. They are methylated silicone oils of low pour point and useful as lubricants at elevated temperature but crictically limited in this application by susceptibility to oxidation and gelation in air at temperatures above 250° C.

It is an object of the present invention to provide a method of rendering liquid polysiloxanes as defined above resistant to oxidation and gelation in air for long periods of time at temperatures which are in the range of 300 to 400° C. It is also an object to provide a method of preparing an adduct-intermediate for stabilizing the liquid polysiloxanes following the method of the invention.

The above and other objects are accomplished by the present invention through the preparation of a cerium methylhydrogen silicone adduct which may be further described as macromolecule in which cerium atoms bearing acetylacetonate ligands are linked through oxygen to silicon in methylsilicon units in the silicone chain, and the use of the adduct as an intermediate in the stabilizing of the liquid polysiloxanes by the method of the invention, all as hereinafter more fully described.

The cerium methylhydrogen silicone adduct may be prepared following the method of the invention from a methylhydrogen polysiloxane which contains from about 0.5 to 1.67% by weight of silane hydrogen, i.e, hydrogen in silicon hydride (—SiH) groups of the silicone chain, and the products of disproportionation in benzene of cerous acetylacetonate monohydrate. These reactants may be taken in the ratio of 1 mole of the methylhydrogen polysiloxane to the products of the disproportionation of from about 3 to 8 moles of cerous acetylacetonate monohydrate to provide adducts which contain from 3 to 8 atoms of cerium per mole of the methylhydrogen polysiloxane. The reaction is carried out by combining the reactants in solution in benzene and heating them under reflux for an hour while bubbling air thereinto at a rate of flow sufficient to maintain the cerium in the ceric state. The benzene is used in excess as the solvent-diluent for the reaction and may be dry or not. The rate of the flow of air into the benzene solution of the reactants may be varied so long as sufficient oxygen is supplied to maintain the cerium in the ceric state. Suitably, the rate of flow of air into the benzene solution may range from about 100 to 500 cc. per minute, with a preferred rate of air flow being about 200 cc. per minute.

The cerium methylhydrogen silicone adduct may be used in benzene solution, as prepared above, for stabilizing of the liquid polysiloxanes by the method of the invention. However, in a preferred procedure for carrying out the stabilizing of the liquid polysiloxanes in accordance with the invention, the adduct is used as a concentrate in a portion of the liquid polysiloxane to be stabilized. This procedure has the advantage of reducing the total volume of the fluid to be handled in the processing of the liquid polysiloxanes with the adduct.

A concentrate of the cerium methylhydrogen silicone adducts can be prepared by adding a small portion of the liquid polysiloxane to be stabilized to the benzene solution of the adduct prepared as described above and removing the benzene therefrom under reduced pressure. The effect of this treatment is to transfer the adduct from solution in benzene to solution in the portion of the liquid polysiloxane. The portion of the liquid polysiloxane which may be used for this purpose may be widely varied, provided that it is sufficient to form a solution with the adduct. However, to the end that a concentrate of the adduct may be had for the purpose of reducing the volume of the fluid to be handled in the stabilizing of the liquid polysiloxanes, a relatively small portion of the total of the liquid polysiloxane to be stabilized is used for forming the concentrate, for example, from about 5 to 10% by weight thereof.

Disproportionation of the cerous acetylacetonate monohydrate, a chelate compound of the empirical formula, $Ce(C_5H_7O_2)_3 \cdot H_2O$, is carried out by heating it in solution in an excess of benzene, which may be dry or not, under reflux, and while bubbling air thereinto until the reaction fluid is wine-red in color. The rate of flow of air into the reaction fluid may be varied and is such as to cause oxidation of the cerium to the ceric state. It may be, for example, from about 100 to 500 cc. per minute, with a preferred rate of flow of the air being about 200 cc. per minute. The disproportionation reaction can be accomplished in about 5 to 10 minutes. Development of the wine-red color in the reaction fluid indicates the disproportionation to have taken place, with oxidation of the cerium to the ceric state. The products, of the disproportionation, contained in solution in the benzene, are ceric acetylacetonate, $Ce(C_5H_7O_2)_4$, basic ceric acetylacetonate, $Ce(C_5H_7O_2)_2(OH)_2$, and the hydrate water.

In the reaction in which the adduct is formed, the methylhydrogen polysiloxane reacts with the basic ceric acetylacetonate and through mediation by the hydrate water with the ceric acetylacetonate. The cerium content of the formed adducts will vary between about 3 to 8 atoms and preferably is from about 3.5 to 3.8 atoms of cerium per mole of the methylhydrogen polysiloxane in the adduct.

In the practice of the method of stabilizing liquid polysiloxanes in accordance with the invention, the cerium polysiloxane adducts, in solution in benzene or as the concentrate, are combined with the liquid polysiloxanes to be stabilized to provide fluid mixtures which contain from about 0.01 to 0.05% and preferably about 0.025% by weight of cerium atoms, and the fluid mixture processed by rapidly heating it to a temperature of 270–280° C. while bubbling air thereinto at a rate to maintain the cerium in the ceric state and continuing the heating at the temperature and while bubbling air thereinto until the reaction fluid is clear, yellow-orange in color, and free from silane hydrogen. The rate of flow of air into the fluid mixture is such as to maintain the cerium in the ceric state and to oxidize the silane hydrogen of the liquid polysiloxane and may be at rates of flow as described above for the reaction forming the adduct. Completion of the reaction is accomplished within about one hour. The absence of silane hydrogen in the finished fluid can be determined by a simple test in which ethanolic potassium hydroxide (1 N) is added to a sample of the fluid. The absence of bubbles (hydrogen) in the sample indicates the absence of silane hydrogen in the fluid.

When the adduct in benzene solution is used for stabilization of the liquid polysiloxanes, it is combined with the total of the liquid polysiloxane to be stabilized. When the adduct is used as a concentrate in solution in a portion of the liquid polysiloxane to be stabilized, the remainder of the total of the liquid polysiloxane to be stabilized is combined therewith to form the fluid mixture to be processed to stabilization.

The fluid compositions obtainable by stabilizing liquid polysiloxanes in accordance with the present invention have a low pour point, a good viscosity-temperature coefficient and are resistant to oxidation and gelation for long periods of time in air at temperatures in the range of 300 to 400° C. and useful as lubricants over a wide temperautre range and at elevated temperatures within the aforesaid range.

The invention is further illustrated by the following specific examples in which the stabilizing of the liquid polysiloxanes by the method of the invention was conducted using the adduct as a concentrate in a portion of the liquid polysiloxane to be stabilized. The preparation and processing operations were conducted successively in a glass flask. The test for the absence of silane hydrogen in the respective fluids was done with ethanolic KOH (1 N) as described above.

*Example 1*

A mixture of 0.082 grams of cerous acetylacetonate monohydrate and 150 ml. of benzene (dry) was heated under reflux and bubbling of dry air thereinto at the rate of 200 cc. per minute until the reaction fluid had changed from an original yellow to a wine-red color, indicating disproportionation of the cerous acetylacetonate to have taken place. The reaction required about five minutes.

A solution in a small amount of dry benzene of 0.125 grams of a methylhydrogenpolysiloxane DC 1107 having a silane hydrogen content of 1.59% by weight and index of refraction $N_D^{20}$ 1.3970 was added to the above products of the disproportionation and the fluid mixture heated under reflux while bubbling dry air thereinto at the rate of 200 cc. per minute for one hour at which time the reaction fluid was clear and of orange-red color. The fluid thus obtained was a benzene solution of the formed cerium methylhydrogen polysiloxane adduct which contained 3.8 atoms of cerium (ceric) per mole of the methylhydrogen polysiloxane therein.

A concentrate of the above adduct was formed by adding 10 grams of dimethyl polysiloxane (DC 200—50 cs.) to the above benzene solution of the adduct, bubbling dry air into the mixed fluid at the rate of 200 cc. per minute, for about a minute, and removing the benzene from the fluid under reduced pressure conditions at 2 mm. Hg with the flask in a warm water bath of about 60° C.

To the concentrate of the adduct in the dimethyl polysiloxane was added an amount of the dimethyl polysiloxane to form 100 grams of fluid containing 0.025% by weight of cerium atoms. This fluid was heated at an accelerated rate while bubbling air thereinto at 200 cc. per minute so as to attain to a liquid temperature of 270° C. in about 8 minutes, after which, under continued bubbling of air thereinto at 200 cc. per minute, it was heated for one hour at 270° C. The resulting fluid was clear, orange-yellow in color, and free from silane hydrogen, and was a stabilized fluid dimethylsilicone composition. Weight loss of the dimethyl silicone was 1.7%.

In the examples which follow, the procedure of Example 1 was repeated for the preparation of the like adduct and the concentrate thereof in a portion of the liquid polysiloxane to be stabilized, and for the processing of the fluid to the stabilized liquid silicone compositions. In these examples, the methylphenyl polysiloxanes had a percent molar ratio of methylphenyl groups to methylmethyl groups attached to the silicon atoms as follows: DC 510—10%, DC F 258—30%, GE SF 1017—50%, DC 550—70% and DC 710—90%.

*Example 2*

To the adduct of the composition of Example 1 as a concentrate in 10 grams of methylphenylpolysiloxane DC 510—50 cs. was added a further amount of the same polysiloxane to form 100 grams of fluid containing 0.025% by weight of cerium atoms and the fluid processed as in Example 1 to the stabilized silicone composition. Weight loss of the polysiloxane was 1%.

*Example 3*

To the adduct of the composition of Example 1 as a concentrate in 10 grams of methylphenylpolysiloxane DC F 258—75 cs. was added a further amount of the same polysiloxane to form 100 grams of fluid containing 0.025% by weight of cerium atoms and the fluid processed as in Example 1 to the stabilized silicone composition. Weight loss of the polysiloxane was 2.1%.

*Example 4*

To the adduct of the composition of Example 1 as a concentrate in 10 grams of methylphenylpolysiloxane GE SF 1017—100 cs. was added a further amount of the same polysiloxane to form 100 grams of fluid containing 0.025% by weight of cerium atoms and the fluid processed as in Example 1 to the stabilized silicone composition. Weight loss of the polysiloxane was 3.8%.

*Example 5*

To the adduct of the composition of Example 1 as a concentrate in 10 grams of methylphenylpolysiloxane DC 500—100 cs. was added a further amount of the same polysiloxane to form 100 grams of fluid containing 0.025% by weight of cerium atoms and the fluid processed as in Example 1 to the stabilized silicone composition. Weight loss of the polysiloxane was 2.5%.

*Example 6*

To the adduct of the composition of Example 1 as a concentrate in 10 grams of methylphenylpolysiloxane DC 710—300 cs. was added a further amount of the same polysiloxane to form 100 grams of fluid containing 0.025% by weight of cerium atoms and the fluid processed as in Example 1 to the stabilized silicone composition. Weight loss of the polysiloxane was 1.4%.

*Example 7*

To the adduct of the composition of Example 1 as a concentrate in 10 grams of methyldichlorophenylpolysiloxane DC F 60—60 cs. was added a further amount of the same polysiloxane to form 100 grams of fluid containing 0.025% by weight of cerium atoms and the fluid processed as in Example 1 to the stabilized silicone composition. Weight loss of the polysiloxane was 3.8%.

*Example 8*

To the adduct of the composition of Example 1 as a concentrate in 10 grams of methyltetrachlorophenylpolysiloxane GE F 50—80 cs. was added a further amount of the same polysiloxane to form 100 grams of fluid containing 0.025% by weight of cerium atoms and the fluid processed as in Example 1 to form the stabilized silicone composition. Weight loss of the polysiloxane was 1.1%.

The efficacy of the method of the invention to enhance the stability of the aforedefined liquid polysiloxanes to oxidation and gelation in air at elevated temperatures in the range of 300 to 400° C. is demonstrated by the results obtained on subjecting stabilized fluid silicone compositions of the above examples to a thin film test which is described below.

In the thin film test, a 0.50 gram sample of the stabilized fluid silicone composition and of the control (untreated liquid polysiloxane) are spread over the bottom of separate Petri dishes (60 mm. x 15 mm.) made of borosilicate glass and exposed in air to the test temperature in a convection (non-circulating) oven. The liquid under test is maintained within 1° C. of the test temperature with a recording controller. The test samples are placed symmetrically on a half-inch thick aluminum plate to assure temperature equivalence. Volatilization losses are measured by periodic weighing of the samples and the elapsed time to gelation recorded. This test exposes the sample fluids to high temperature under ready access of oxygen (air) with continuous rapid removal of volatile products by convection action and oven ventilation.

The results obtained by the thin film test conducted at 300° C. and 400° C. on the stabilized fluid silicone compositions of the above examples and the controls appear in the table below. Test results at 400° C. are not tabulated for the DC 200 DC F 60 and GE F 60 silicones or for their corresponding stabilized fluid silicone compositions due to the lack of stability of these fluids at 400° C.

TABLE

| Example | Silicone | Hours to Gelation | | | |
|---|---|---|---|---|---|
| | | Composition | | Control | |
| | | 300° C. | 400° C. | 300° C. | 400° C. |
| 1 | DC 200 | 473 | -------- | 1 | -------- |
| 2 | DC 510 | 802 | 15 | 2 | <½ |
| 3 | DC F 258 | 570 | 66 | 7 | <½ |
| 4 | GE SF 1017 | 900 | 42 | 14 | <½ |
| 5 | DC 550 | 932 | 92 | 30 | 1 |
| 6 | DC 710 | 258 | 20 | 44 | 1½ |
| 7 | DC F 60 | 390 | -------- | 1 | -------- |
| 8 | GE F 50 | 70 | -------- | 1½ | -------- |

It has been generally recognized that the thermal stability of the liquid polysiloxanes as defined above is an important factor at temperatures above 300° C. The spectacular stability to oxidation and gelation at 400° C. of certain of the liquid processed polysiloxanes as recorded in the above table indicates an accompanying increase in their thermal stability.

Since the invention described herein may be variously embodied without departing from the spirit or scope thereof, it is intended that specific embodiments of the invention appearing in the above description shall be taken as illustrative rather than in limitation except as may be required by the appended claims.

What is claimed is:

1. A method of preparing a cerium methylhydrogen polysiloxane adduct which comprises preparing a solution in benzene of the disproportionation products of cerous acetylacetonate monohydrate by heating from about 3 to 8 moles of said monohydrate in solution in an excess of benzene under reflux and bubbling of air thereinto until the resulting benzene solution is wine-red in color, combining said resulting benzene solution of disproportionation products with a benzene solution of a methylhydrogen polysiloxane having from about 0.5 to 1.67% by weight of silane hydrogen and in proportions to yield a resultant benzene solution which contains from about 3 to 8 atoms of cerium per mole of said methylhydrogen polysiloxane, and heating said resulting benzezne solution under reflux for about one hour while bubbling air thereinto at a rate sufficient to maintain the cerium in the ceric state.

2. A method of preparing a cerium methylhydrogen polysiloxane adduct as described in claim 1, wherein the resultant benzene solution which is subjected to heating under reflux while bubbling air thereinto contains said methylhydrogen polysiloxane and said disproportionation products in proportions which provide therein from about 3.5 to 3.8 atoms of cerium per mole of the methylhydrogen polysiloxane.

3. A method of stabilizing a liquid polysiloxane of the group consisting of liquid methyl-methylphenylmethyl chlorophenyl- and methylphenyl chlorophenyl polysiloxanes which comprises combining a liquid polysiloxane of the aforesaid group with an adduct as prepared in claim 1 which is in solution in a portion of the same liquid polysiloxane in proportions to form a fluid mixture which contains from about 0.01 to 0.05% by weight of cerium atoms, rapidly heating said fluid mixture to a temperature in the range of 270 to 280° C. while bubbling air thereinto at a rate sufficient to maintain the cerium in the ceric state and oxidize silane hydrogen therein, and continuing the heating at said temperature and the bubbling of air thereinto until the resulting fluid is clear and free from silane hydrogen.

4. A method as defined in claim 3, wherein the fluid mixture subjected to heating and bubbling of air thereinto contains said liquid polysiloxane and said solution of the adduct in proportions which provide about 0.025% by weight of cerium atoms therein.

References Cited by the Examiner
UNITED STATES PATENTS 2,465,296  3/1949  Swiss _____ 252—49.7 X
3,008,901  11/1961 Baker et al. _____ 252—49.7

DANIEL E. WYMAN, *Primary Examiner.*

P. P. GARVIN, W. H. CANNON, *Assistant Examiners.*